Patented Apr. 29, 1930

1,756,497

UNITED STATES PATENT OFFICE

HARRY R. WARREN, OF CHICAGO, ILLINOIS, ASSIGNOR TO WARREN-TEED SEED COMPANY, OF CHICAGO, ILLINOIS, A CORPORATION OF NEVADA

METHOD OF TREATING ALFALFA, CLOVER, AND OTHER HARD-SHELLED SEEDS TO PROMOTE PROMPT GERMINATION AND REMOVE WEED SEEDS THEREFROM

No Drawing. Application filed November 15, 1928. Serial No. 319,718.

Certain classes of seeds, notably the clovers, alfalfa, onion, sweet peas and the like, are impervious to moisture to such a degree that when planted they will not absorb the moisture essential to germination for months, and in some cases for a year or more. In most cases some of the seeds germinate promptly, some after a delay of months and some after a delay of a year or even years. This non-uniform germination has several very serious results. Only those seeds that germinate promptly produce a crop within the season. So far as crop production is concerned the other seeds are wasted. Not only are they wasted, but they germinate long after another and different kind of crop has been put in and constitute a pest as deleterious as any weed. The farmer is thus compelled to pay for and go to the expense of preparing the ground for and planting seeds, a large proportion of which not only fail to materialize into a profitable crop, but on the contrary produce a pest which can only be removed at the expense of time and labor. It is therefore essential, if an economical use of the seed is to be had, that they all germinate uniformly and promptly. To secure this result it has heretofore been the practice to treat the entire mass of seeds in a machine (known as a scarifier) provided with an abrading surface against which the seeds are thrown, by centrifugal force or otherwise, whereby the coating of the seeds which resists moisture penetration is reduced or partially removed, to the end that the seeds when planted may be more promptly penetrated by moisture and hence germinate more quickly. This method, however, is open to serious objection. If the scarification is carried far enough to sufficiently affect the seeds most impervious to moisture the others are over-scarified and the germs thereof injured. If the scarification is only carried far enough to properly treat those seeds that are mediumly slow to germinate, the quickly germinating seeds are over-scarified and injured while those that require the longest time to germinate are under-scarified and hence do not germinate promptly.

One object of the present invention is to secure prompt and uniform germination of the whole mass of seeds. A further object is to separate out any weed seeds that may be present. With these objects in view the mass of seeds is separated, in any suitable manner, into three classes, those which germinate quickly, those which germinate after moderate delay, and those which only germinate after prolonged delay. These classes are hereinafter referred to as soft, medium hard and hard seeds, since it is believed that the three classes have respectively soft, medium hard and hard coatings. After the soft seed have been separated out of the mass of seeds, the medium hard and the hard seeds are so treated as to cause them to absorb moisture more readily to the end that the three classes, when planted may absorb moisture promptly and hence germinate uniformly. Any suitable means may be employed and any suitable method followed in effecting this separation of the seeds into the three classes, but preferably the mass of mixed seeds is soaked for from twenty minutes to one hour in a suitable liquid, such as a saccharine solution, though pure water may be used. Preferably they are soaked in a 22° Baumé glucose solution. This has two advantages;—it does not extract the color from the seeds when they are soaked therein, and when dried on the seeds it affords a protective covering that is readily dissolved by moisture when the seeds are planted and supplies nourishment to the young plants. The time during which this soaking should continue will vary somewhat with different batches of seeds, and will also depend on the temperature of the water, a longer time being required with a low temperature than with a higher temperature. Care should be used not to raise the temperature high enough to injure germination. It has been found safe to use water at a temperature as high as 125° F., but as a general rule a temperature of 70° F. to 115° F. or lower should be maintained. The lower temperature increases the time during which the seeds must be soaked, but is preferred because of the certainty that it will not injure germination.

As a result of this soaking the soft seeds will swell while the medium hard and hard seeds will not swell to a perceptible degree, and the soft seeds can then be separated from the medium hard and the hard seeds by screening or by the use of a gravity solution, after which they are dried. After the soft seeds have been separated out of the mass, the medium hard and hard seeds are placed in a scarifier and moderately scarified.

After this moderate scarification the medium hard and the hard seeds are again soaked in water as before. As a result of the moderate scarification the medium hard seeds will absorb water and swell in a short time (from twenty to sixty minutes) while the hard seeds will not, and the two classes of seeds are separated by screening or the gravity method, as in the case of the soft seeds. The medium hard seeds, when thus separated, are dried, and the hard seeds are returned to the scarifier to be still further scarified in the presence of water, to the end that they too may be rendered capable of promptly absorbing moisture. It will be understood, of course, that in the screening operation a screen is used having a mesh which will permit the seeds that are not swelled to pass therethrough but will not permit the swelled seeds to pass.

As a result of the foregoing treatment the seeds are separated into the three classes—to wit, soft, medium hard and hard, and are all capable of absorbing moisture with approximately equal facility. Hence the three classes may, if desired, be mixed and planted together with the assurance that they will germinate promptly and with substantial uniformity; or the three classes may be planted each to itself with like prompt and uniform results.

Most of the weed seeds that are present in mixture with hard field seeds, such as alfalfa seeds or clover seeds, will not absorb water as readily as do the soft and the scarified medium hard or scarified hard field seeds. The result of this is that they do not swell to the extent that the field seeds do, and hence, when the soft and medium hard field seeds are separated by screening or by gravity solution from the hard seeds, the weed seeds remain mixed with the latter. When the hard field seeds have been scarified, as indicated above, however, they too absorb moisture and swell and are then readily separated from the weed seeds by screening or by gravity solution. Any weed seeds that may be present with the swelled and separated soft or medium hard seeds may be removed in the same way.

After soaking, as hereinbefore described, the seeds are, of course, wet or moist and tend to more or less adhere together forming masses which render it difficult to screen the seeds so as to effectively separate the swollen seeds from the others. It has been discovered, however, that if the seeds are passed over the screen under water or with a current of water flowing through the screen these adherent masses are broken up, and the smaller or unswollen seeds readily pass through the screen while the swollen seeds do not, and the separation can thus be effected with great rapidity.

In the foregoing description, it has been assumed that the hard shelled field seeds (such as alfalfa or clover seeds) treated have been taken en masse in the condition in which the producer delivers them. In this condition, the various sizes of seeds are commingled and have more or less deleterious weed seeds mixed with them. Instead of treating the seeds with the various sizes thus commingled, it is sometimes preferable to first size the seeds; that is, separate the various sizes without regard to whether they are soft, medium hard or hard. This separation of the seeds into classes solely according to their size may be accomplished by passing them over a series of screens, each screen in the series being of a slightly larger mesh than the immediately preceding one. This results in grading the seeds into several classes solely according to size. Each of these classes comprises soft, medium hard and hard seeds mixed with more or less weed seeds, and each class is then treated as hereinbefore described to separate the soft, the medium hard and the hard seeds and to eliminate the weed seeds.

After the soft, medium hard and the hard seeds have been treated as herein described and thoroughly dried, the three classes may be again commingled and when the same are planted it will be found that the entire mass of seeds will germinate with practical uniformity. If desired, however, the several classes may be kept separate. In either case it will be found that the valuable field seeds are entirely free from weed seeds and that uniform germination occurs in a short period of time after planting.

It will be apparent to those skilled in the art that various modifications of the method of treatment described may be resorted to without departing from the broad principle of the invention. Thus the seeds may be soaked in pure water or other liquid; or at temperatures differing from those indicated as preferable; or the screening may occur in the absence of water. Any or all of these changes, as well as others, may be resorted to without departing from the broad principle of the invention as defined in the claims hereto appended, but the desired results will be realized in the highest degree when the several steps of the method are carried out in the manner herein specified as preferable.

I do not claim broadly the step of soaking the seeds in a color-fixing or non-color-extracting solution, since such step, broadly stated, is the invention of John L. Kellogg, but what I do claim is:—

1. In a method of treating seeds of the same kind but of varying degrees of hardness to secure uniform germination, the steps of soaking the seeds, separating out the seeds that swell by such soaking, scarifying the remaining seeds, soaking the scarified seeds in water and then separating out the seeds that swell as the result of said last soaking.

2. In a method of treating seeds of the same kind but of varying degrees of hardness to secure uniform germination, the steps of soaking the seeds, between 70° F. and 125° F., separating out the seeds that swell as the result of such soaking, scarifying the remaining seeds, then soaking the scarified seeds at a temperature between 70° F. and 125° F., and then separating out the seeds that swell as the result of said last soaking.

3. In a method of treating seeds of the same kind but of varying degrees of hardness to secure uniform germination, the steps of soaking the seeds, separating out the seeds that swell as the result of such soaking, scarifying the remaining seeds, soaking the scarified seeds, separating out the seeds that swell as the result of said second soaking, and again scarifying the remaining seeds.

4. In a method of treating seeds of the same kind but of varying degrees of hardness to secure uniform germination, the steps of soaking the seeds, at a temperature between 70° F. and 125° F., separating out the seeds that swell as the result of such soaking, scarifying the remaining seeds, soaking the scarified seeds in water at a temperature between 70° F. and 125° F., separating out the seeds that swell as the result of said second soaking, and then again scarifying the remaining seeds.

5. In a method of treating seeds of the same kind but of varying degrees of hardness to secure uniform germination, the steps of soaking the seeds, separating out the seeds that swell as the result of such soaking, scarifying the remaining seeds, again soaking the scarified seeds, separating out the seeds that swell as the result of such second soaking, and separating weed seeds from the remainder.

6. In a method of treating seeds of the same kind but of varying degrees of hardness to secure uniform germination, the steps of soaking the seeds, separating out the seeds that swell as the result of such soaking, scarifying the remaining seeds, again soaking the scarified seeds, separating out the seeds that swell as the result of such second soaking, again scarifying the then remaining seeds, and separating weed seeds from said then remaining seeds.

7. In a method of treating seeds of the same kind but of varying degrees of hardness to secure uniform germination, the steps of soaking the seeds, separating out the seeds that swell as the result of such soaking, scarifying the remaining seeds, again soaking the scarified seeds, separating out the seeds that swell as the result of such second soaking, again scarifying the then remaining seeds, and separating weed seeds from the three classes of seeds thus secured.

8. In a method of treating seeds of the same kind but of varying degrees of hardness to secure uniform germination, the steps of soaking the seeds, screening out in the presence of water the seeds that swell as the result of such soaking, scarifying the remaining seeds, again soaking the scarified seeds, and screening out in the presence of water the seeds that swell as the result of such second soaking.

9. In a method of treating seeds of the same kind but of varying degrees of hardness to secure uniform germination, the steps of separating the seeds into different classes according to size, then soaking the seeds of one of said sized classes, and then separating out the seeds that swell as the result of such soaking.

10. In a method of treating seeds of the same kind but of varying degrees of hardness to secure uniform germination, the steps of separating the seeds into different classes according to size, soaking the seeds of one class in water having glucose dissolved therein, and then separating out the seeds that swell as the result of such soaking.

11. In a method of treating seeds of the same kind but of varying degrees of hardness to secure uniform germination, the steps of soaking and thereby swelling the seeds and then screening out in the presence of water the seeds that swell as the result of such soaking.

12. In a method of treating seeds of the same kind but of varying degrees of hardness to secure uniform germination, the steps of soaking the seeds for from twenty minutes to one hour, separating out the seeds that are swelled by such soaking, then soaking the remaining seeds for from twenty minutes to one hour, and then separating out the seeds that are swelled as the result of said second soaking.

13. The method of treating seeds of the same kind, but of varying degrees of hardness, to secure uniform germination which consists in subjecting the mass of seeds to moisture whereby some of them are swelled, separating from the mass the seeds so swelled, and scarifying the remaining seeds of the mass to quicken their moisture-absorbing action.

14. In a method of treating seeds of the same kind, but of varying degrees of hardness, to secure uniform germination, the steps of separating the seeds into classes of differing moisture-absorbing properties, and treating the classes that absorb moisture slowly to quicken their moisture-absorbing action.

15. In a method of treating seeds of the same kind, but of varying degrees of hardness, to secure uniform germination, the steps of separating the seeds into classes of differing moisture-absorbing properties, and then scarifying the classes that absorb moisture slowly to quicken their moisture-absorbing action.

16. In a method of treating seeds of the same kind, but of varying degrees of hardness, to secure uniform germination, the steps of separating the seeds into classes of differing moisture-absorbing properties and then imparting to all of the classes but one approximately the moisture-absorbing action of that one.

17. The method of treating seeds that vary in moisture-absorbing action which consists in imparting varying degrees of scarification to different classes of said seeds, whereby the moisture absorbing action of said different classes is rendered substantially uniform.

18. In a method of treating seeds of the same kind but of varying degrees of hardness to secure uniform germination, the steps of soaking and thereby swelling the seeds in a saccharine solution, separating out the seeds that are swelled by such soaking, and then drying the seeds so separated out, whereby a saccharine coating is left on the seeds and their natural color is retained.

19. In a method of treating seeds of the same kind but of varying degrees of hardness to secure uniform germination, the steps of soaking and thereby swelling the seeds in a glucose solution, separating out the seeds that are swelled by such soaking, and then drying the seeds so separated out, whereby a glucose coating is left on the seeds and their natural color is retained.

20. In a method of treating seeds of the same kind but of varying degrees of hardness to secure uniform germination, the steps of soaking the seeds in a saccharine solution, separating out the seeds that are swelled by such soaking, moderately scarifying the remaining seeds, soaking the scarified seeds in a saccharine solution, separating out the seeds that are swelled by such second soaking, and drying the separated seeds, whereby a saccharine coating is left thereon.

21. In a method of treating seeds of the same kind but of varying degrees of hardness to secure uniform germination, the steps of soaking the seeds in a glucose solution, separating out the seeds that are swelled by such soaking, moderately scarifying the remaining seeds, soaking the scarified seeds in a glucose solution, separating out the seeds that are swelled by such second soaking, and drying the separated seeds, whereby a glucose coating is left thereon.

22. In a method of treating seeds of the same kind but of varying degrees of hardness to secure uniform germination, the step of soaking and thereby swelling the seeds in a saccharine solution.

23. In a method of treating seeds of the same kind but of varying degrees of hardness to secure uniform germination, the step of soaking and thereby swelling the seeds in a glucose solution.

In testimony whereof I have signed this specification.

HARRY R. WARREN.